United States Patent
Bernau et al.

(10) Patent No.: US 10,870,445 B2
(45) Date of Patent: Dec. 22, 2020

(54) HYDRAULIC STEERING SYSTEM

(71) Applicant: Jungheinrich Aktiengesellschaft, Hamburg (DE)

(72) Inventors: René Bernau, Moosburg (DE); Rainer Sedlmaier, Kirchberg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 223 days.

(21) Appl. No.: 16/053,180

(22) Filed: Aug. 2, 2018

(65) Prior Publication Data
US 2019/0039646 A1 Feb. 7, 2019

(30) Foreign Application Priority Data
Aug. 2, 2017 (DE) .................. 10 2017 213 407

(51) Int. Cl.
*B62D 5/09* (2006.01)
*B62D 5/30* (2006.01)
(Continued)

(52) U.S. Cl.
CPC .............. *B62D 5/09* (2013.01); *B62D 5/06* (2013.01); *B62D 5/10* (2013.01); *B62D 5/30* (2013.01);
(Continued)

(58) Field of Classification Search
CPC ... B62D 5/09; B62D 5/06; B62D 5/10; B62D 5/30; B62D 5/32; B62D 15/021; B66F 9/07568; B66F 9/22
See application file for complete search history.

(56) References Cited

U.S. PATENT DOCUMENTS 6,213,246 B1 * 4/2001 Bohner .................. B62D 5/003
 180/403
6,450,285 B1 9/2002 Horwath et al.
(Continued)

FOREIGN PATENT DOCUMENTS

| DE | 19819404 | 11/1999 |
|---|---|---|
| DE | 102013104794 | 11/2014 |
| EP | 2801509 A2 * | 12/2014 |

OTHER PUBLICATIONS

German Application No. 102017213407.0, Search Report dated Jun. 12, 2018, 8 pages.

*Primary Examiner* — Ruth Ilan
*Assistant Examiner* — Marlon A Arce
(74) *Attorney, Agent, or Firm* — Kilpatrick Townsend & Stockton LLP

(57) ABSTRACT

The present invention relates to a hydraulic steering system for a vehicle, in particular an industrial truck, comprising: a steering cylinder having two chambers and a hydraulic connection at each of the two chambers for activating a steering movement of at least one wheel of the vehicle; at least one hydraulic pump; at least one hydraulic tank for receiving hydraulic oil; and a steering block which comprises: two first hydraulic connections for connecting to the two hydraulic connections of the steering cylinder; at least two second hydraulic connections for supplying hydraulic oil from the hydraulic pump to the steering block and feeding the hydraulic oil back into the hydraulic tank; and a controllable valve assembly which receives control signals from a steering angle detection device and is designed to convey hydraulic oil to the steering cylinder on the basis of said control signals; the controllable valve assembly being further designed to be shiftable into at least one neutral position in which it allows a flow of hydraulic oil between the two chambers of the steering cylinder. The hydraulic
(Continued)

steering system further comprises a pump device which is designed to stimulate the flow of hydraulic oil between the two chambers of the steering cylinder when the valve assembly is in the neutral position.

10 Claims, 1 Drawing Sheet

(51) Int. Cl.
*B62D 15/02* (2006.01)
*B62D 5/10* (2006.01)
*B62D 5/32* (2006.01)
*B62D 5/06* (2006.01)
*B66F 9/22* (2006.01)
*B66F 9/075* (2006.01)

(52) U.S. Cl.
CPC ............ *B62D 5/32* (2013.01); *B62D 15/021* (2013.01); *B66F 9/07568* (2013.01); *B66F 9/22* (2013.01)

(56) References Cited

U.S. PATENT DOCUMENTS

| | | | | |
|---|---|---|---|---|
| 6,502,661 | B1* | 1/2003 | Heitzer | B62D 3/14 |
| | | | | 180/403 |
| 2003/0196432 | A1* | 10/2003 | Pedersen | B62D 5/07 |
| | | | | 60/384 |
| 2013/0318953 | A1* | 12/2013 | Geissler | B60K 25/04 |
| | | | | 60/384 |
| 2016/0341308 | A1* | 11/2016 | Rathke | F15B 13/06 |

* cited by examiner

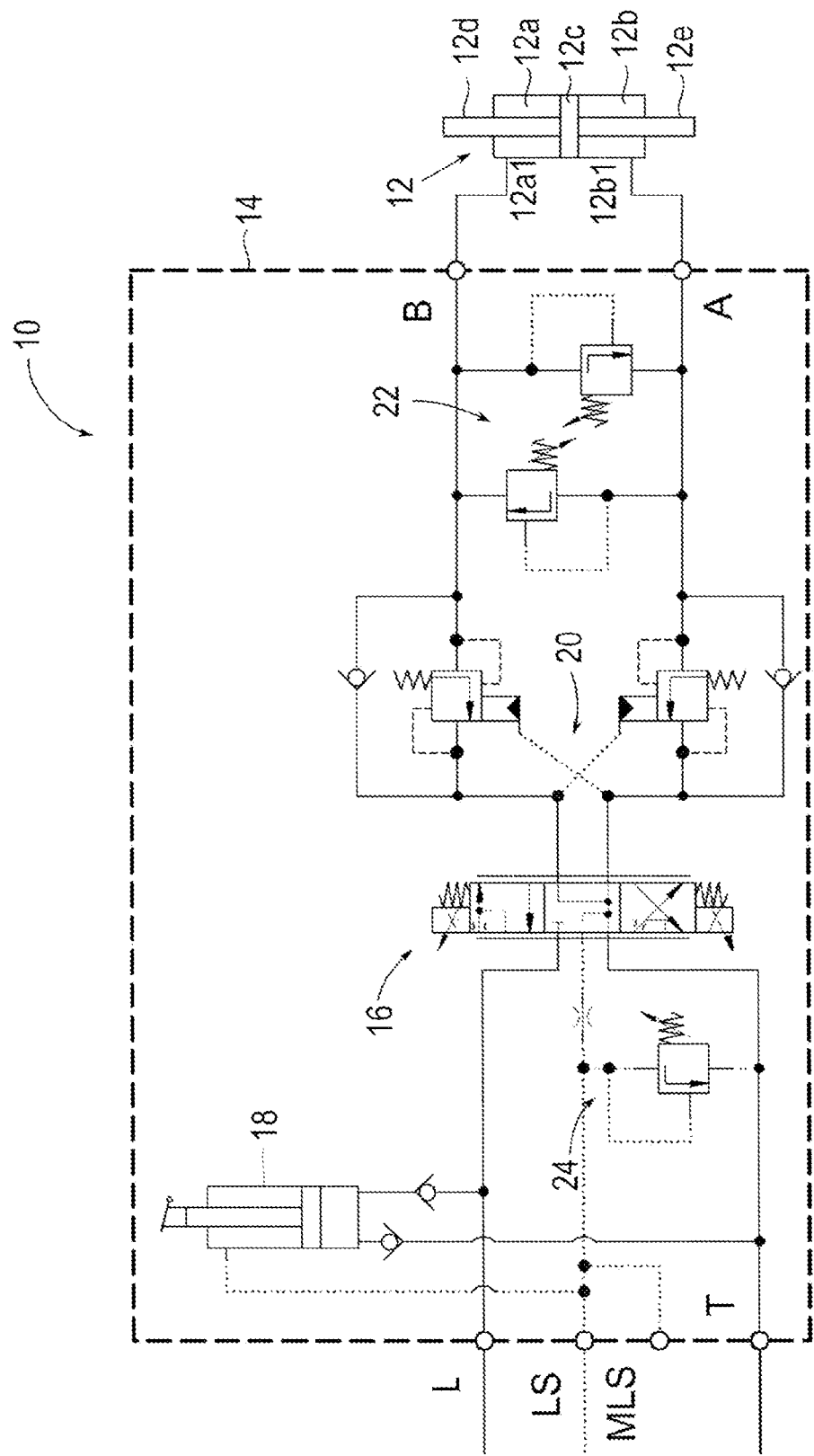

HYDRAULIC STEERING SYSTEM

CROSS REFERENCE TO RELATED APPLICATION

This application claims priority to German Patent Application No. 10 2017 213 407.0, filed in Germany on Aug. 2, 2017, the entire contents of which are hereby incorporated herein by this reference.

The present invention relates to a hydraulic steering system for a vehicle, in particular an industrial truck, comprising a steering cylinder having two chambers and a hydraulic connection at each of the two chambers for activating a steering movement of at least one wheel of the vehicle, at least one hydraulic pump, at least one hydraulic tank for receiving hydraulic oil, and a steering block which comprises two first hydraulic connections for connecting to the two hydraulic connections of the steering cylinder, at least two second hydraulic connections for supplying hydraulic oil from the hydraulic pump to the steering block and feeding the hydraulic oil back into the hydraulic tank, and a controllable valve assembly which receives control signals from a steering angle detection device and is designed to convey hydraulic oil to the steering cylinder on the basis of said control signals, the controllable valve assembly being further designed to be shiftable into at least one neutral position in which it allows a flow of hydraulic oil between the two chambers of the steering cylinder.

The realisation of vehicle steering movements, in particular of industrial trucks, that are intended to be carried out by at least one steerable wheel of the vehicle, by direct transmission of the direction of rotation and speed of rotation of a steering wheel movement by means of a steering unit is known from the prior art. A generic steering device based on this operating principle is known for example from DE 198 19 404 A1.

It is also known to use what are known as compact aggregates for this purpose, which are usually stored in the counterweight of the industrial truck.

In hydraulic steering systems of this kind, there is no mechanical connection between the steering wheel and the steered wheels, and therefore it must be ensured that the steering allows at least for temporary emergency steering even in the case of failure of the hydraulic pump or other components. Emergency steering functions of this kind are already integrated in part in steering units such as those from DE 198 19 404 A1 and can be realised by manually rotating the motor shaft in the case of compact aggregates.

Although the devices mentioned are components that have proven their worth, it has also been demonstrated that they are associated with various disadvantages. For instance, the steering units described are not very efficient, and the integration thereof in the vehicle, and in particular in industrial trucks, requires a large amount of space since a complex steering column is required which limits the space available in the footwell of the vehicle. Furthermore, for the insertion of said units, high-pressure steering unit lines have to be installed close to the vehicle driver region, which can lead to disruptive flow-related noise during the steering movement. On the other hand, the compact aggregates also mentioned above are very expensive in comparison with steering units, and also require a lot of space for the integration thereof in the vehicle.

The problem addressed by the present invention is therefore that of providing a hydraulic steering system having an integrated emergency steering device, in which the above-described disadvantages of known devices are overcome, but which also combines the advantages of steering units and compact aggregates. The invention provides a cost-effective, space-saving and energy-efficient steering system having an improved emergency steering function.

In order to solve this problem, the hydraulic steering system according to the invention further comprises a pump device which is designed to stimulate the flow of hydraulic oil between the two chambers of the steering cylinder when the valve assembly is in the neutral position. Activating said pump device allows an emergency steering function to be carried out by means of a forced flow of hydraulic oil between the two chambers of the steering cylinder, it being possible for the hydraulic steering system to remain compact and cost-effective by integrating the pump device therein.

In particular, if the hydraulic steering system does not have its own hydraulic pump, but rather the steering system shares a single hydraulic pump with other hydraulic loads of the vehicle, it can be advantageous for the steering system according to the invention to further comprise a priority valve which is designed to ensure an adequate supply of hydraulic oil to the steering block in comparison with other loads during normal operation of the hydraulic pump and the vehicle.

In a particularly simple and cost-effective embodiment of the steering system according to the invention, the pump device is manually operable. This creates a universal emergency steering function which does not rely on a supply of power or hydraulics and thus remains usable even if there is a comprehensive breakdown of all the vehicle's systems. On the other hand, however, an electrically driven pump device or similar could be provided; in this case, however, it should preferably be ensured that said device can also be operated independently of the vehicle's on-board systems, for example by an independent power supply in the form of a battery being provided.

Insofar as the hydraulic steering system according to the invention comprises a conventionally dimensioned steering cylinder, it can also be advantageous for the pump device to have a stroke volume of approximately 7-8 $cm^3$. This value has proven to be an optimum compromise between operability and installation space and cost reductions.

Since, as stated above, it is also desirable to ensure the emergency steering function of the hydraulic steering system according to the invention even in the case of a complete breakdown of all vehicle systems, it can be further advantageous for the valve assembly to comprise a manual shifting means for shifting into the at least one neutral position, for example a lever that is operable by the vehicle driver.

In a further preferred embodiment of the steering system according to the invention, the valve assembly can be shifted into two different neutral positions which in each case allow one of the two directions of flow of hydraulic oil from one of the two chambers of the steering cylinder into the other. In this way, selecting the particular neutral position makes it possible to set the steering direction that is taken by the at least one steerable wheel by activating the pump.

In order to ensure a robust and reliable operation of the hydraulic steering system according to the invention, it can also be advantageous for said system to comprise at least one shock valve in each of the connection lines between the steering block and the steering cylinder, which valve is designed to prevent the steering cylinder from being damaged by overloading.

For similar reasons, it can also be advantageous for the hydraulic steering system according to the invention to comprise at least one pressure control valve at one or more suitable points, for example in hydraulic lines.

Finally, in order to reduce the installation space required for the hydraulic steering system according to the invention, it can be advantageous for the pump device to be integral with the steering block, for example received in a common housing or mounted on the steering block.

According to a second aspect, the present invention relates to a vehicle, in particular an industrial truck, comprising at least one steerable wheel, at least one steering angle detection device which detects a steering direction and/or steering speed of a steering device that is operable by the driver of the vehicle, for example a steering wheel, and which outputs control signals, and comprising a hydraulic steering system according to the invention which receives the control signals from the steering angle detection device and is arranged and designed so as to activate a steering movement of the at least one steerable wheel.

In the vehicle according to the invention, the valve assembly can be arranged for example in a counterweight, a driver overhead guard, a frame or an engine compartment of the vehicle, depending on further boundary conditions.

BRIEF DESCRIPTION OF THE FIGURE

Further characteristics and advantages of the present invention will become apparent from the following description of an embodiment when said description is considered together with the accompanying FIGURE. The FIGURE is a schematic view of a hydraulic steering system according to the invention.

DETAILED DESCRIPTION

In FIG. 1, one embodiment of the hydraulic steering system according to the invention is denoted in general by reference sign 10. Said system comprises a hydraulic steering cylinder 12, which in turn comprises a first and a second chamber 12a, 12b and a piston 12c. As a result of hydraulic oil being pumped into one of the two chambers 12a, 12b via a particular hydraulic connection 12a1, 12b1 and hydraulic oil thus being forced out of the other chamber, the piston 12c is moved in the cylinder and generates, by means of two connecting rods 12d, 12e, a steering movement of two wheels (not shown) of a vehicle (not shown either) in which the hydraulic steering system 10 shown is used.

The hydraulic system 10 further comprises a steering block 14 which comprises two first hydraulic connections A, B for connecting to the two hydraulic connections 12a1, 12b1 of the steering cylinder 12 via hydraulic lines, and three second hydraulic connections, namely P and LS for the pressure and priority supply via a priority valve (not shown) and T for feeding the oil back into the hydraulic tank (not shown either).

The steering block 14 further comprises a controllable valve assembly 16 in the form of a four/three-way proportional valve. Said proportional valve forms a controllable valve assembly 16 which can be controlled by means of control signals from a steering angle detection device such that it conveys hydraulic oil to the steering cylinder 12 in order to trigger the desired steering movement there.

Furthermore, the proportional valve 16 can be manually shifted into two neutral positions in which the two chambers 12a, 12b of the steering cylinder 12 are shorted together by means of a hand pump 18. Depending on which of the two neutral positions is manually selected, activating the hand pump 18 leads either to a flow of hydraulic oil from the first cylinder chamber 12a into the second cylinder chamber 12b, or vice versa. In this way, hydraulic oil can be pumped between the two chambers 12a and 12b of the steering cylinder 12 in order to carry out an emergency steering function, even without an additional hydraulic tank.

On account of the pump 18 being manually operable and also it being possible for the proportional valve 16 to be manually shifted into the two neutral positions, the emergency steering function can also be provided even in the case of a complete breakdown of all the vehicle's hydraulic and electrical systems.

Finally, the hydraulic steering system 10 includes a load-holding valve 20, a shock valve 22 and a pressure control valve 24, by means of which the normal operation of the steering system 10 is ensured in a known manner.

The invention claimed is:

1. Hydraulic steering system for a vehicle comprising:
    a steering cylinder having two chambers and a hydraulic connection at each of the two chambers for activating a steering movement of at least one wheel of the vehicle;
    at least one hydraulic pump;
    at least one hydraulic tank for receiving hydraulic oil;
    a steering block which comprises:
        two first hydraulic connections for connecting to the two hydraulic connections of the steering cylinder;
        at least two second hydraulic connections for supplying hydraulic oil from the hydraulic pump to the steering block and feeding the hydraulic oil back into the hydraulic tank; and
        a controllable valve assembly which receives control signals from a steering angle detection device and is designed to convey hydraulic oil to the steering cylinder on the basis of said control signals, wherein the controllable valve assembly is further designed to be shiftable into at least one neutral position in which it allows a flow of hydraulic oil between the two chambers of the steering cylinder; and
    a pump device which is designed to stimulate the flow of hydraulic oil between the two chambers of the steering cylinder when the valve assembly is in the neutral position, wherein the pump device is integral with the steering block.

2. Hydraulic steering system according to claim 1, further comprising a priority valve which is designed to ensure an adequate supply of hydraulic oil to the steering block in comparison with other loads.

3. Hydraulic steering system according to claim 1, wherein the pump device is manually operable.

4. Hydraulic steering system according to claim 1, wherein the pump device has a stroke volume of approximately 7-8 cm$^3$.

5. Hydraulic steering system according to claim 1, wherein the valve assembly comprises a manual shifting means for shifting into the at least one neutral position.

6. Hydraulic steering system according to claim 1, wherein the valve assembly can be shifted into two neutral positions which in each case allow one of the two directions of flow of hydraulic oil from one of the chambers of the steering cylinder into the other.

7. Hydraulic steering system according to claim 1, further comprising at least one shock valve in each of the connections of the steering block to the steering cylinder, which valve is designed to prevent the steering cylinder from being damaged by overloading.

8. Hydraulic steering system according claim 1, further comprising at least one pressure control valve.

9. A vehicle comprising:
  at least one steerable wheel;
  at least one steering angle detection device which detects at least one of a steering direction or a steering speed of a steering device that is operable by a driver of the vehicle and which outputs control signals; and
  a hydraulic steering system which receives the control signals from the steering angle detection device and is arranged so as to activate a steering movement of the at least one steerable wheel, wherein the hydraulic steering system comprises:
    a steering cylinder having two chambers and a hydraulic connection each of the two chambers for activating a steering movement of the at least one steerable wheel;
    at least one hydraulic pump;
    at least one hydraulic tank for receiving hydraulic oil;
    a steering block which comprises:
      two first hydraulic connections for connecting to the two hydraulic connections of the steering cylinder;
      at least two second hydraulic connections for supplying hydraulic oil from the hydraulic pump to the steering block and feeding the hydraulic oil back into the hydraulic tank; and
      a controllable valve assembly which receives control signals from a steering angle detection device, wherein the controllable valve assembly is designed to convey hydraulic oil to the steering cylinder on the basis of said control signals and to be shiftable into at least one neutral position in which it allows a flow of hydraulic oil between the two chambers of the steering cylinder; and
    a pump device which is designed to stimulate the flow of hydraulic oil between the two chambers of the steering cylinder when the valve assembly is in the neutral position, and wherein the pump device is integral with the steering block.

10. Vehicle according to claim 9, wherein the valve assembly is arranged in a counterweight, driver overhead guard, frame or engine compartment of the vehicle.

\* \* \* \* \*